US007856157B2

(12) United States Patent
Beinhocker

(10) Patent No.: US 7,856,157 B2
(45) Date of Patent: Dec. 21, 2010

(54) PIPELINE SECURITY SYSTEM

(75) Inventor: Gilbert D. Beinhocker, Belmont, MA (US)

(73) Assignee: Tamperproof Container Licensing Corp., Belmont, MA (US)

( * ) Notice: Subject to any disclaimer, the term of this patent is extended or adjusted under 35 U.S.C. 154(b) by 156 days.

(21) Appl. No.: 12/283,302

(22) Filed: Sep. 9, 2008

(65) Prior Publication Data

US 2009/0067777 A1 Mar. 12, 2009

Related U.S. Application Data

(60) Provisional application No. 60/993,310, filed on Sep. 11, 2007.

(51) Int. Cl.
*G02B 6/00* (2006.01)

(52) U.S. Cl. .......................................... 385/12; 385/13

(58) Field of Classification Search .................. 385/12, 385/13
See application file for complete search history.

(56) References Cited

U.S. PATENT DOCUMENTS

| | | | |
|---|---|---|---|
| 2,311,613 | A | 2/1943 | Slayter |
| 3,320,114 | A | 5/1967 | Schulz |
| 3,634,845 | A | 1/1972 | Colman |

(Continued)

FOREIGN PATENT DOCUMENTS

| | | |
|---|---|---|
| DE | 485 035 | 10/1929 |

(Continued)

OTHER PUBLICATIONS

"AIS—USGC Navigation Center," http://www.navcen.uscg.gov/enav/ais.htm, (2009).

(Continued)

*Primary Examiner*—Rhonda S Peace
(74) *Attorney, Agent, or Firm*—Weingarten, Schurgin, Gagnebin & Lebovici LLP

(57) ABSTRACT

The present invention provides a security system for a pipeline, such as an oil, gas or water pipeline, or other tubular, elongated or other structures used to convey various other liquid, gaseous or fluent materials. The invention is also useful in protecting a tunnel such as a vehicular tunnel. A flexible and wrappable sensor sheet is provided having an optical fiber or electrical wire disposed therein in a zigzag or other pattern which covers substantially the entire area of the sheet. The sensor sheet containing the fiber or wire is wrapped around the outer surface of a pipeline or other structure, and provides a covering of substantially the entire outer surface of a predetermined length of the pipeline. Similar sheets can be employed on adjacent pipeline sections to provide protection of any intended length of the pipeline, which may include the entire effective pipeline length. The individual sensor sheets can be interconnected to provide one continuous optical or electrical path through the adjacent sensor sections for the entire pipeline length or any part thereof. A light or current source is provided at one end of the continuous path to introduce light or current into the path. A light or current detector is coupled to the other end of the path to sense light or electrical current from the path. Alternatively each sensor section can have its own light or current source and its own light or current detector for sensing a signal from the respective paths.

31 Claims, 2 Drawing Sheets

U.S. PATENT DOCUMENTS

| | | | | |
|---|---|---|---|---|
| 3,714,644 | A | 1/1973 | Hellstrom | |
| 3,947,837 | A | 3/1976 | Bitterice | |
| 4,095,872 | A | 6/1978 | Stieff et al. | |
| 4,118,211 | A | 10/1978 | Au Coin et al. | |
| 4,161,348 | A | 7/1979 | Ulrich | |
| 4,175,827 | A | 11/1979 | McMahon | |
| 4,195,907 | A | 4/1980 | Zamja et al. | |
| 4,217,488 | A | 8/1980 | Hubbard | |
| 4,228,425 | A | 10/1980 | Cooke | |
| 4,234,875 | A | 11/1980 | Williams | |
| 4,297,684 | A | 10/1981 | Butter | |
| 4,367,460 | A * | 1/1983 | Hodara | 340/550 |
| 4,447,123 | A | 5/1984 | Page et al. | |
| 4,488,269 | A | 12/1984 | Robinson et al. | |
| 4,538,527 | A | 9/1985 | Kitchen | |
| 4,573,202 | A | 2/1986 | Lee | |
| 4,603,252 | A | 7/1986 | Malek et al. | |
| 4,772,092 | A | 9/1988 | Hofer et al. | |
| 4,801,213 | A | 1/1989 | Frey et al. | |
| 4,867,820 | A | 9/1989 | Jacobson et al. | |
| 4,908,510 | A | 3/1990 | Huggins et al. | |
| 4,931,771 | A | 6/1990 | Kahn | |
| 4,935,723 | A | 6/1990 | Vallance | |
| 4,936,649 | A * | 6/1990 | Lymer et al. | 385/13 |
| 4,972,176 | A | 11/1990 | Vallance | |
| 5,015,842 | A * | 5/1991 | Fradenburgh et al. | 250/227.15 |
| 5,026,141 | A * | 6/1991 | Griffiths | 385/13 |
| 5,049,855 | A | 9/1991 | Slemon et al. | |
| 5,081,363 | A | 1/1992 | Tetzlaff et al. | |
| 5,119,862 | A | 6/1992 | Maimets et al. | |
| 5,180,060 | A | 1/1993 | Forti et al. | |
| 5,194,847 | A | 3/1993 | Taylor et al. | |
| 5,309,533 | A | 5/1994 | Bonniau et al. | |
| 5,323,011 | A | 6/1994 | Suter et al. | |
| 5,355,208 | A | 10/1994 | Crawford et al. | |
| 5,359,416 | A | 10/1994 | Mueller | |
| 5,567,932 | A | 10/1996 | Staller et al. | |
| 5,568,124 | A | 10/1996 | Joyce et al. | |
| 5,592,149 | A | 1/1997 | Alizi | |
| 5,609,952 | A | 3/1997 | Weiss | |
| 5,769,232 | A | 6/1998 | Cash et al. | |
| 5,790,025 | A | 8/1998 | Amer et al. | |
| 5,918,268 | A | 6/1999 | Lukas et al. | |
| 6,002,501 | A * | 12/1999 | Smith et al. | 398/9 |
| 6,065,870 | A | 5/2000 | Nunez | |
| 6,079,875 | A * | 6/2000 | Klass et al. | 374/130 |
| 6,213,167 | B1 | 4/2001 | Greenland | |
| 6,556,138 | B1 | 4/2003 | Sliva et al. | |
| 6,879,257 | B2 | 4/2005 | Hisano | |
| 6,891,470 | B2 | 5/2005 | Bohinc, Jr. | |
| 6,919,803 | B2 | 7/2005 | Breed | |
| 6,995,353 | B2 * | 2/2006 | Beinhocker | 250/227.14 |
| 7,098,444 | B2 | 8/2006 | Beinhocker | |
| 7,211,783 | B2 * | 5/2007 | Beinhocker | 250/227.14 |
| 7,245,791 | B2 * | 7/2007 | Rambow et al. | 385/12 |
| 7,332,728 | B2 * | 2/2008 | Beinhocker | 250/474.1 |
| 7,352,284 | B2 | 4/2008 | Krill | |
| 7,394,060 | B2 * | 7/2008 | Beinhocker | 250/227.14 |
| 7,482,924 | B1 * | 1/2009 | Beinhocker | 340/555 |
| 7,532,781 | B2 * | 5/2009 | Thompson et al. | 385/13 |
| 7,608,812 | B2 * | 10/2009 | Beinhocker | 250/227.14 |
| 2002/0089434 | A1 | 7/2002 | Ghazarian | |
| 2003/0151509 | A1 | 8/2003 | Iannotti et al. | |
| 2003/0174059 | A1 | 9/2003 | Reeves | |
| 2003/0193032 | A1 | 10/2003 | Marshall | |
| 2004/0037091 | A1 | 2/2004 | Guy | |
| 2004/0046660 | A1 | 3/2004 | Ando | |
| 2004/0047142 | A1 | 3/2004 | Goslee | |
| 2004/0056767 | A1 | 3/2004 | Porter | |
| 2005/0180677 | A1 * | 8/2005 | Andrews et al. | 385/13 |
| 2006/0151656 | A1 | 7/2006 | Gallagher et al. | |
| 2007/0001844 | A1 | 1/2007 | Krill | |
| 2007/0037462 | A1 * | 2/2007 | Allen et al. | 442/5 |

FOREIGN PATENT DOCUMENTS

| | | |
|---|---|---|
| GB | 13359 | 1/1914 |
| WO | WO 93/11513 | 6/1993 |
| WO | WO 93/23648 | 11/1993 |
| WO | WO 98/26388 | 6/1998 |

OTHER PUBLICATIONS

Bonner, Robert C., "Remarks of U.S. Customs Commissioner Robert C. Bonner*: U.S. Customs and Border Protection C-TPAT Conference San Francisco, California Oct. 30, 2003," http://www.cpb.gov/xp/cgov/newsroom/commissioner/ speeches_statements/0ct30,2003.xml (8 pages).

Brichard et al., "Gamma dose rate effect in erbium-doped fibers for space gyroscopes" IEEE, 3 pages, (2003).

Kimura et al., "New Techniques to Apply Optical Fiber Image Guide to Nuclear Facilities," J. Nuc. Sci. and Tech., vol. 39, No. 6, pp. 603-607 (Jun. 2002).

Lu et al., "Gamma-induced attenuation in normal single-mode and multimode, Ge-doped and P-doped optical fibers: A fiber optic dosimeter for low dose levels," Published on the NRC Research Press Web site on May 11, 2000, Can. J. Phys. vol. 78, pp. 89-97.

Nucsafe Inc., Introduction "Fiber Sensing Technology—The Long and Short of It," http://nucsafe.com/Puma/introduction.htm May 21, 2004, p. 1 of 1.

Nucsafe Inc., "Why Neutrons," http://nucsafe.com/Puma/why_neutrons.htm, May 21, 2004, p. 1 of 1.

Nucsafe Inc., "Guardian CRMS," http://nucsafe.com/Puma/guardian_crms.htm, pgs. May 21, 2004, 6 pages.

Nucsafe Inc., "Fiber Facility," http://nucsafe.com/Puma/fiber_facilities.htm, May 21, 2004, 2 pages.

Nucsafe Inc., "Detecting Neutrons," http://nucsafe.com/Puma/detecting_neutrons.htm, May 21, 2004, 3 pages.

Nucsafe Inc., "Photonics," http://nucsafe.com/Puma/pr_photonicsspectra.htm, Jul. 9, 2004, 2 pages.

Nucsafe Inc., "Tech Transfer," http://nucsafe.com/Puma/pr_techtransfer.htm, Jul. 9, 2004, 2 pages.

Nucsafe Inc., "Press Release—First Applauds Job Creation at Oak Ridge Based-Nucsafe," http://nucsafe.com/Puma/pr_knoxnews.htm, Jul. 9, 2004, 3 pages.

Nucsafe Inc., "Optical Properties," http://nucsafe.com/Puma/properties_of scintillating_fibe.htm, Jan. 12, 2005, p. 1 of 1.

Ott, Melanie N., "Radiation Effects Data on Commercially Available Optical Fiber: Database Summary," Nuclear Science and Radiation Effects Conference, Phoenix, Arizona, NSREC 2002, Data Workshop Proceedings, Jul. 2002, 8 pages (we believe this to be accurate).

Ott, Melanie N., "Radiation Effects Expected for Fiber Laser/Amplifier Rare Earth Doped Optical Fiber," NASA Survey Report (Mar. 26, 2004), 7 pages.

Poly-Optical Products, http://www.poly-optical.com/specifications.html, (2003).

Simpson, Doug, "US port security system set for launch," www.boston.com/news/nation/articles/2004/03/25/us_port_security_system_set_for_launch?mode=PF, pp. 2 of 2, (2002).

Giallorenzi et al. Optical fiber sensor technology, IEEE Journal of Quantum Electronics, vol. QE-18, No. 4 (Apr. 1982), pp. 626-665.

* cited by examiner

PIPELINE SECURITY SYSTEM

CROSS REFERENCE TO RELATED APPLICATIONS

This application claims the benefit under 35 U.S.C. §119 (e) of U.S. Provisional Patent Application No. 60/993,310, filed on Sep. 11, 2007.

This application is related to: U.S. Pat. No. 6,995,353 issued on Feb. 7, 2006, entitled TAMPER-PROOF CONTAINER; U.S. patent application Ser. No. 11/496,029, filed Jul. 28, 2006, entitled TAMPER DETECTION SYSTEM and which issued as U.S. Pat. No. 7,608,812 on Oct. 27, 2009; U.S. Pat. No. 7,211,783 issued May 1, 2007, entitled TAMPER-PROOF CONTAINER; U.S. Pat. No. 7,098,444 issued Aug. 29, 2006, entitled TAMPER PROOF CONTAINER; U.S. Pat. No. 7,332,728, issued Feb. 19, 2008, entitled TAMPER PROOF CONTAINER; U.S. Pat. No. 7,394,060 issued Jul. 1, 2008, entitled TAMPER DETECTION SYSTEM HAVING A PLURALITY OF INFLATABLE LINER PANELS WITH OPTICAL COUPLERS; U.S. patent application Ser. No. 11/796,130 filed Apr. 26, 2007, entitled CARGO CONTAINER SECURITY SYSTEM COMMUNICATIONS which issued as U.S. Pat. No. 7,482,924 on Jan. 27, 2009 and U.S. patent application Ser. No. 12/070,194, filed Feb. 15, 2008, entitled INTEGRATED OPTICAL NEUTRON DETECTOR which issued as U.S. Pat. No. 7,619,226 on Nov. 17, 2009.

STATEMENT REGARDING FEDERALLY SPONSORED RESEARCH OR DEVELOPMENT

N/A

BACKGROUND OF THE INVENTION

Security systems are shown and described in the related U.S. Patents and applications identified above for protection of containers, enclosures, fences and other objects which utilize one or more sheets having a signal path extending across at least a portion of the sheet. The signal path is monitored for a change such as a loss or reduction of continuity in an electrical or optical characteristic of the signal path. Typically the signal path is composed of an optical fiber disposed across substantially the entire area enclosing the protected space. If in an attempt to breach or intrude upon the protected space, one or more portions of the optical path are broken or altered, causing a detectable change in the optical path that can be used to trigger an alarm such as an annunciator or to cause a notification signal to be sent to a monitoring station via any of a wide variety of existing networks or communication links. A break in the optical path will affect the light transmission and the cessation of this transmission is used to provide a detectable change to trigger an alarm. Alternatively, radiation can reduce or alter the light transmittance of the optical path, and a detected change in the optical path transmission can be used to trigger an alarm.

In alternative implementation, a thin electrical wire or conductive path can be utilized rather than the optical fiber. An electrical signal or energy source and electrical detector are employed to detect a break in the conductive path in order to trigger an alarm condition.

One major use for the security systems thus described are for the protection of shipping or cargo containers. The signal path is provided within liner sheets disposed in the interior of the container adjacent to each of the container sides or walls. The security system can also be embodied in a variety of other containers which can be of any shape and size to enclose a protected space or object therein.

It would be desirable to have a security system similar to the type described above for the protection of pipelines and other similar structures.

BRIEF SUMMARY OF THE INVENTION

The present invention provides a security system for a pipeline, such as an oil, gas or water pipeline, or other tubular, elongated or other structures used to convey various other liquid, gaseous or fluent materials. The invention is also useful in protecting a tunnel such as a vehicular tunnel.

In accordance with the present invention, a flexible and wrappable sensor sheet is provided having an optical fiber or electrical wire disposed therein in a zigzag or other pattern which covers substantially the entire area of the sheet. The sheet can be a fabric material in which the optical fiber or electrical wire fiber is woven or otherwise disposed, or can be of other types of flexible woven or non-woven material containing the optical fiber or electrical wire. The sensor sheet containing the fiber or wire is wrapped around the outer surface of a pipeline or other structure, and provides a covering of substantially the entire outer surface of a predetermined length of the pipeline. Similar sheets can be employed on adjacent pipeline sections to provide protection of any intended length of the pipeline, which may include the entire effective pipeline length. The sheet can contain or have added thereto a resin or other material which can be hardened or rigidized after the pipe is wrapped with the sensor sheet to act as a protective covering and to retain the sheet about the outer surface of the pipe.

The individual sensor sheets can be interconnected to provide one continuous optical or electrical path through the adjacent sensor sections for the entire pipeline length or any part thereof. A light or current source is provided at one end of the continuous path to introduce light or current into the path. A light or current detector is coupled to the other end of the path to sense light or electrical current from the path. Alternatively each sensor section can have its own light or current source and its own light or current detector for sensing a signal from the respective paths.

By use of the invention, a pipeline or other protected structure or item can be monitored in order to detect an attempt to breach the pipeline wall in order to thwart terrorism, vandalism or theft of the contents of a pipeline or other structure. A break in the signal path will cause cessation of the signal and provide a detectable change to trigger an alarm. In the case of an optical fiber used to define the signal path, the presence of radiation within or outside of the pipeline or other structure can reduce or alter the light transmittance of the optical fiber and cause a detectable change in the optical path transmission which can be used to trigger an alarm.

BRIEF DESCRIPTION OF THE SEVERAL VIEWS OF THE DRAWINGS

The invention will be further described in the following detailed description, in conjunction with the drawings, in which.

DETAILED DESCRIPTION OF THE INVENTION

The disclosure of the above noted U.S. Pat. Nos. 6,995,353, 7,211,783, 7,098,444, 7,332,728, 7,394,060, and co-pending applications U.S. patent application Ser. Nos. 11/496,029, filed Jul. 28, 2006, 11,796,130 filed Apr. 26, 2007 and 12,070, 194, filed Feb. 15, 2008, are incorporated by reference herein.

Figure 1:
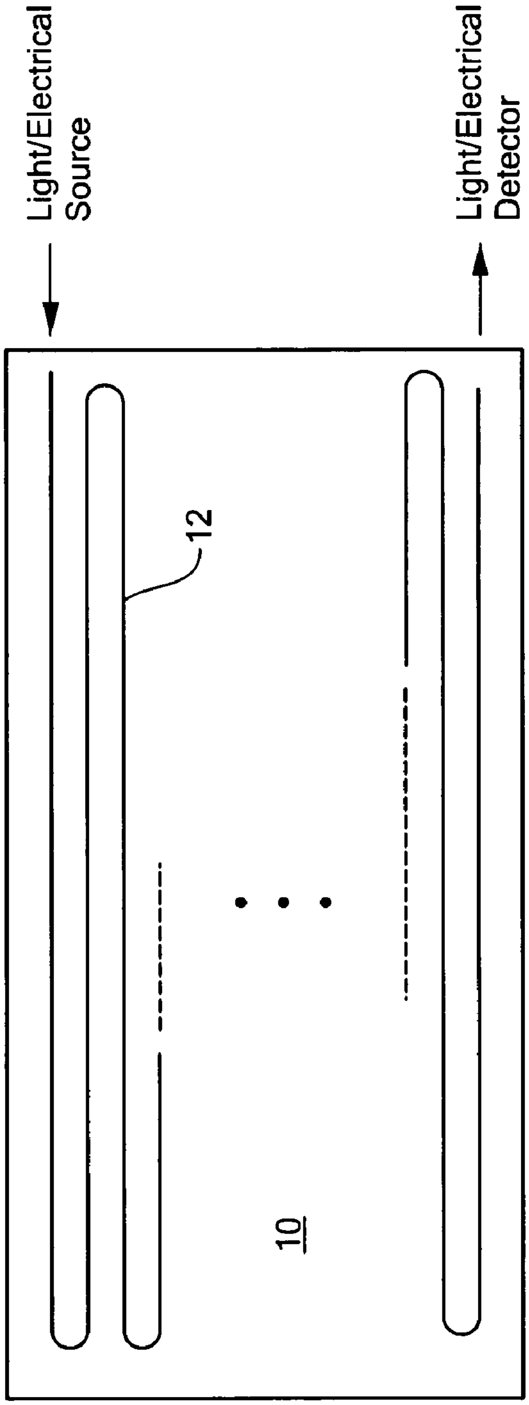
FIG. 1 is a diagrammatic view of a sheet containing an optical or electrical path therein, in accordance with the invention.

A sensor sheet in accordance with the invention is illustrated diagrammatically in FIG. 1. A sheet 10 of flexible and wrappable material has disposed therein across substantially the entire area thereof an optical fiber or electrical wire 12 having a first end and a second end. The optical fiber or electrical wire define a continuous signal path from the first end to the second end. A light source in the case of an optical fiber or an electrical source in the case of an electrical wire provides a light or electrical signal to the first or input end of the path. A light detector in the case of an optical fiber or an electrical detector in the case of an electrical wire is coupled to the second or receiving end of the signal path and detects the light or electrical signal from the path and provides an output signal indication thereof. The optical fiber or electrical wire can be woven into a fabric sheet or can be disposed in a sheet of non-woven material. The sheet can be of any material which is flexible and wrappable such that the sheet can be wrapped around the outer surface of a pipeline or other structure to be protected. The sheet can contain or have added to the sheet a resin or other material which can be hardened or rigidized after the pipe is wrapped with the sensor sheet to act as a protective covering and to retain the sheet about the outer surface of the pipe. The sheet may be retained about the pipe by other means as well, such as an outer protective covering placed over the sheet wrapped onto the pipe and which is secured to retain the sensor sheet in place on the outer surface of the pipe. The sensor sheet may be sandwiched or laminated with other materials providing intended protection or other functionality, such as structural protection, abrasion resistance and the like.

In one embodiment, the sensor sheet is made of a flexible rollable material. The sheet is rolled up prior to installation on the pipe or other elongated object to be protected. The sheet is unrolled during installation and wrapped around the pipeline or section thereof to provide a sensor which covers the entire intended area of the pipeline surface.

The individual sensor sheets can be interconnected to provide one continuous optical or electrical path through the adjacent sensor sections. Alternatively, each sensor section can have its own independent light or current source and its own light or current detector.

In one embodiment, the optical fiber can be woven into the fabric as it is made such that a long web of fabric can be manufactured and rolled onto a reel for shipment to an installation site. The fabric can be unrolled and extended along a section of pipeline and secured thereto to substantially cover the outer surface of the pipeline section. Similar fabric webs can be wrapped about adjacent sections of the pipeline such that the entire length of the pipeline or an intended extent of the pipeline is covered by the sensor fabric. Optical connectors or couplers are provided at respective ends of the web sections and which are interconnected to provide a continuous optical path through the adjacent web sections which cover the pipeline. This method allows any resolution for detection of even a small breach of the pipeline.

Light from a suitable source is introduced into one end of the sensor sheet or web and an optical sensor or detector is disposed at the other end of the sensor sheet or web to detect light emanating from the continuous optical path. The light detector is coupled to signal processing circuitry which is operative to provide an alarm signal in the event of failure of the detected light or diminishment of detected light below a predetermined threshold. A breach at any point in the optical path of the optical fiber will cause a disconnection in the light signal, and the absence of light at the light detector will trigger an alarm condition. Radiation near the sensor sheet from within or outside of the pipeline reduces the optical transmissibility of the optical fiber. The optical fiber core and/or its cladding constitute a large size physical radiation detector and integrates the radiation over time and/or over the length and volumetric mass of the fiber, making the fiber sensitive to even low level radiation. Local environmental background radiation can be measured to offset the detection level designated to trigger an alarm. The optical fiber is monitored for a change in its transmissibility and a reduction in the transmissibility below a threshold level can trigger an alarm. The alarm can be in the form of an annunciator and/or can be the sending of a message that can include information about the time or location of the breach.

Figure 2:
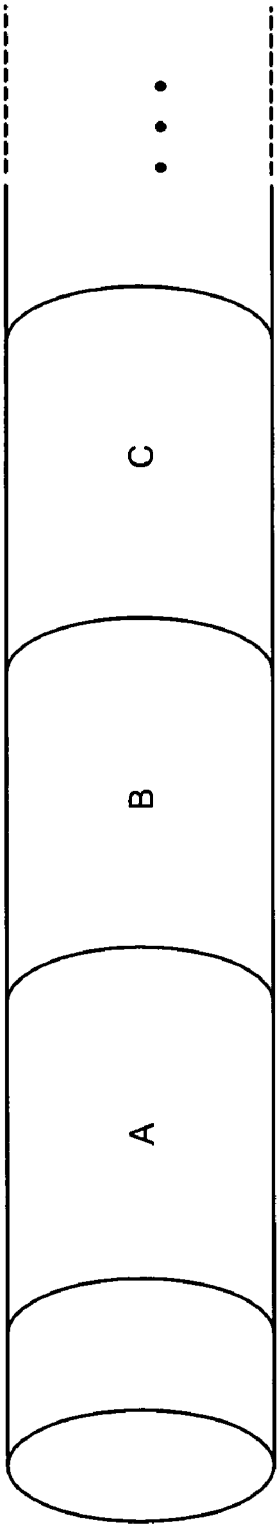
FIG. 2 is a diagrammatic view of a section of a pipeline having a plurality of sensor sheets wrapped along contiguous sections of the pipeline.

Any size pipeline can be wrapped with liner made of fabric or other flexible material that can be wrapped over the outer surface of the pipeline. Any suitable material such as polymer resins can be employed that can structurally and functionally hold optical fiber or electrical wire placed in any geometrical pattern, with any space resolution between optical fibers or electrical wires. Each optical fiber or electrical wire forms a single continuous optical or electrical pathway for any designated section such as shown in FIG. 1. Each individual section can have its own light or current source, or its own light or current detector. Each section can have its own GPS/comm unit or location memory chip/comm so that any break in a section causes transmission of a detailed geographical and time of intrusion signal to one or more pipeline monitoring stations. As shown in FIG. 2, a section can be any length or width so as to fit a pipeline with appropriate coverage and length so that a break or intrusion into the pipeline can instantly cause an alarm signal specifying the exact position on the pipeline, and, because of the resolution structure, the approximate size of the intrusion. A hard resin can fix the sections securely to the pipeline, and provide resistance to an intrusion or break and hence give the most informative information in real-time on the intrusion. This is far superior to current pressure or volumetric measuring systems which now are used to determine an intrusion or break. If the intrusion or break is catastrophic, or of some predetermined threshold magnitude, it shuts the entire pipeline down automatically, which can significantly mitigate a substantial economic loss and environmental damage. The present system serves as an early warning network for the entire length of pipeline for purposes of effecting counter-measures against an intrusion which may be caused by theft of product, vandalism, terrorism, or a naturally occurring break which will not only cause economic damage, but if the break is small enough such as caused by a hunter firing a bullet into the pipeline for vandalism or amusement, and goes undetected for an extended period of time, can possibly cause serious ecological damage to the environment and to the surroundings of the pipeline, or put people at risk of injury or death, if the intrusion or break occurs in an urban area. Additionally many pipelines in urban areas are accidentally ruptured during construction work. If the pipeline is carrying gas under high pressure there can be, and historically have been, catastrophic consequences. The system gives an alarm at the first instance of damage and can help control and mitigate resulting loss.

The sensor sheets can be installed on site at a pipeline or other structure to be protected. Alternatively, the sensor sheet could be integrated onto pipeline sections during assembly of a pipeline or other structure.

Figure 3:
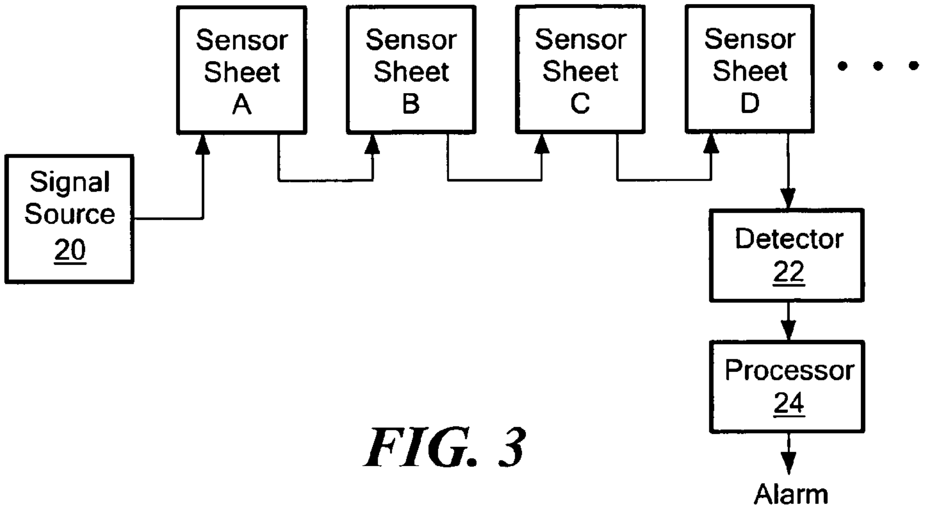
FIG. 3 is a block diagram of an embodiment of the invention having a plurality of interconnected sensor sheets.

FIG. 3 shows in schematic form an embodiment of the invention in which the sensor sheets are interconnected to provide a single continuous signal path. The optical fiber or electrical wire providing the signal path in each of the sensor sheets, is serially interconnected with the optical fiber or wire of adjacent sheets such that a single signal path is provided from one end of the interconnected sheets to the opposite end of the interconnected sheets covering the entire pipeline. A signal source 10 provides an optical or electrical signal to the continuous path, depending on whether an optical fiber or electrical wire is used for the path. A detector 12 is coupled to the opposite end of the continuous path to sense the optical or electrical signal from the path and to provide an output signal to a processor 14 which is operative to provide an alarm notification signal in the event of the loss of a signal from the signal path or in the event of a sufficient degradation in the signal to cause an alarm condition.

Figure 4:
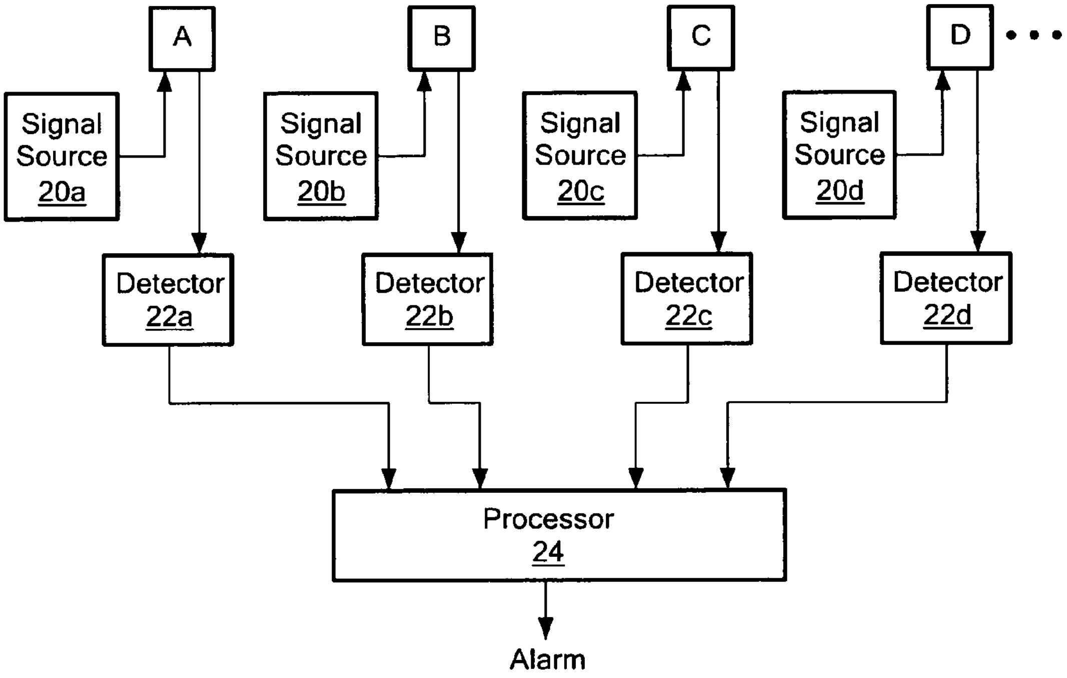
FIG. 4 is a block diagram of an embodiment of the invention in which each of the sensor sheets has its own signal source and detector.

FIG. 4 shows in schematic form an embodiment in which each of the sensor sheets has its own signal source and detector. In this embodiment, each of the sensor sheets A, B, C and D has a signal source 20*a*-20*d* coupled to one end of the signal path of the respective sheets. The other end of the signal path of the respective sheets is coupled to respective detectors 22*a*-22*d*. The output from each of the detectors 22*a*-22*d* is connected to a processor 24 which provides an output signal in the event of an alarm condition sensed by any one or more of the detectors. The alarm notification in this embodiment can provide an indication of which detector has sensed an alarm condition and therefore indicate in real time which sensor sheet and therefore which section of the pipeline has experienced an actual or attempted intrusion.

The invention is also useful for the protection of tunnels such as tunnels for automobiles, trucks, trains or other vehicles and tunnels for other purposes such as construction and utility tunnels. For this purpose, the sensor sheets can be wrapped around inner and/or outer surfaces of the tunnel and interconnected as described above to provide one or more continuous signal paths for detection of a break in the path which will trigger an alarm or for detection of a decrease in signal strength, in the embodiment wherein a optical fiber provides the signal path which is sensitive to incident nuclear radiation as described above.

The invention inherently provides a fail/safe system since any loss of optical or electrical signal whether by actual intrusive damage failure of a power supply or other components will automatically cause an alarm signal to be sent in the absence of detection of a continuous light or electrical signal being constantly detected by the system. Additionally, the system can be turned on and off on a random or periodic basis to provide a "heartbeat" signal indicating that the system is functioning properly.

The invention described herein can also be employed for other tubular or elongated objects or for objects having curved surfaces around which the sensor sheet can be wrapped and secured. Such objects include tanks of cylindrical or other shapes and other items which can be accommodated by the flexible and wrappable sensor sheets. Therefore, the invention is not to be limited by the embodiments shown and described and is to embrace the full scope and spirit of the appended claims.

What is claimed is:

1. A security system for an elongated tubular structure, the system comprising:

a plurality of flexible sheets arranged contiguously along a longitudinal direction of the tubular structure and each configured to circumferentially wrap around an external surface of a respective section of a predetermined length of the structure, to cover the entire area of the respective section of the tubular structure, and each of the sheets having at least one signal path disposed in the sheet and extending across substantially the entire area of the sheet, the at least one signal path having a first end and a second end;

the plurality of contiguous sheets covering the entire area of the predetermined length of the tubular structure;

at least one signal source coupled to the first end of the at least one signal path of each of the plurality of flexible sheets;

at least one detector coupled to the second end of the at least one signal path and operative to detect a signal in the signal path from the first end to the second end, and when a loss of signal is detected, output a first signal, wherein the at least one detector includes a detector for each of the sheets coupled to the at least one signal path of the respective sheet; and a circuit coupled to the at least one detector and operative to provide an alarm indication upon the occurrence of the first signal, wherein the circuit is coupled to each of the detectors and operative to provide an indication of the identity or location of the respective sheets.

2. The security system of claim 1 wherein the structure is a pipeline.

3. The security system of claim 1 wherein the structure is a tank.

4. The security system of claim 1 wherein the structure is a tunnel.

5. The security system of claim 1 wherein the at least one signal path is an optical fiber.

6. The security system of claim 5 wherein:

the at least one signal source is operative to provide a light signal; and wherein the at least one detector is operative to detect a light signal from the respective signal path.

7. The security system of claim 1 wherein the at least one signal path is an electrical wire.

8. The security system of claim 7 wherein:

the at least one signal source is operative to provide an electrical signal; and wherein the at least one detector is operative to detect an electrical signal from the respective signal path.

9. The security system of claim 1 wherein at least one of the plurality of flexible sheets is rigidizable after being wrapped on the external surface of a section of the structure.

10. The security system of claim 1 wherein at least one of the plurality of flexible sheets is sandwiched between two layers of protective materials.

11. The security system of claim 1 wherein the circuit is configured to activate an alarm if an optical characteristic of the at least one signal path changes.

12. The security system of claim 1 wherein at least one of the flexible sheets has a resin applied thereto after wrapping of the sheet around a section of the structure to rigidize the sheet.

13. The security system of claim 1 wherein the at least one signal path of each sheet is woven into the respective sheet.

14. The security system of claim 1 wherein the at least one signal source includes a signal source for each of the sheets coupled to the first end of the at least one signal path of the respective sheet.

15. The security system of claim 1 wherein the circuit is further operative to provide an indication of which of the at least one detector has output a respective first signal.

16. The security system of claim 1 wherein each at least one detector is configured to transmit a geographical and time of intrusion signal upon detection of a loss of signal in the respective at least one signal path.

17. The security system of claim 1 wherein each flexible sheet comprises fabric.

18. The security system of claim 1 wherein at least one of the plurality of sheets is retained about the structure by an outer protective covering placed over the sheet wrapped onto the structure, wherein the outer protective covering is secured to retain the sheet in place.

19. A security system for an elongated tubular structure, the system comprising:

a plurality of flexible sheets arranged contiguously along a longitudinal direction of the tubular structure and each configured to circumferentially wrap around an external surface of a respective section of a predetermined length of the structure, to cover the entire area of the respective section of the tubular structure, and each of the flexible sheets having a signal path disposed therein and extending across substantially an entire area of the sheet, each signal path having a first end and a second end;

the plurality of contiguous sheets covering the entire area of the predetermined length of the tubular structure;

a plurality of detectors, each detector coupled to a respective second end of a respective signal path and operative to detect a change in a signal in the respective signal path and to output a first signal indication of a detected change; and a circuit coupled to each of the plurality of detectors and operative to provide an alarm indication upon an occurrence of the first signal, wherein the circuit is further operative to provide an indication of the identity or location of a flexible sheet corresponding to a detector from which the first signal was received.

20. The security system of claim 19 further comprising:

at least one signal source coupled to the first end of the signal path of each of the plurality of flexible sheets.

21. The security system of claim 20 wherein the at least one signal source comprises a plurality of signal sources each coupled to a respective first end of a respective signal path.

22. The security system of claim 20 wherein:

each signal path comprises optical fiber;

wherein the at least one signal source is operative to provide a light signal; and wherein each detector is operative to detect a light signal from the respective signal path.

23. The security system of claim 20 wherein:

each signal path comprises an electrical wire;

wherein the at least one signal source is operative to provide an electrical signal; and wherein each detector is operative to detect an electrical signal from the respective signal path.

24. The security system of claim 19 wherein each flexible sheet comprises fabric.

25. The security system of claim 19 wherein the structure is a pipeline.

26. The security system of claim 19 wherein the structure is a tank.

27. The security system of claim 19 wherein the structure is a tunnel.

28. The security system of claim 19 wherein at least one of the plurality of flexible sheets is rigidizable after being wrapped on the external surface of a section of the structure.

29. The security system of claim 19 wherein at least one of the plurality of flexible sheets is sandwiched between two layers of protective materials.

30. The security system of claim 19 wherein at least one of the plurality of flexible sheets has a resin applied thereto to rigidize the at least one sheet.

31. The security system of claim 19 wherein at least one of the plurality of sheets is retained about the structure by an outer protective covering placed over the sheet wrapped onto the structure, wherein the outer protective covering is secured to retain the sheet in place.

* * * * *